United States Patent [19]

Baulmann

[11] Patent Number: 4,461,784

[45] Date of Patent: Jul. 24, 1984

[54] ELECTRON BEAM CURING OF UNSATURATED COATING MATERIALS

[75] Inventor: Wilhelm L. Baulmann, Leichlingen, Fed. Rep. of Germany

[73] Assignee: Hermann Wiederhold GmbH, Helden, Fed. Rep. of Germany

[21] Appl. No.: 485,892

[22] Filed: Apr. 18, 1983

[30] Foreign Application Priority Data

Apr. 21, 1982 [DE] Fed. Rep. of Germany ....... 3214757

[51] Int. Cl.³ ............................................... B05D 3/06
[52] U.S. Cl. ...................................... 427/44; 427/54.1
[58] Field of Search ....................... 427/44, 53.1, 54.1, 427/35, 36

[56] References Cited

U.S. PATENT DOCUMENTS

| 3,077,424 | 2/1963 | Maker et al. | 428/445 |
| 3,203,805 | 8/1965 | Burg | 430/254 |
| 3,368,900 | 2/1968 | Burg . | |
| 3,531,317 | 9/1970 | Patheiger et al. | 427/35 |
| 4,072,592 | 2/1978 | Dué et al. | 427/54.1 |

*Primary Examiner*—John H. Newsome
*Attorney, Agent, or Firm*—Cushman, Darby & Cushman

[57] ABSTRACT

A curable polymer system is applied to a substrate as a coating and is cured by electron-bombardment, there being added to the polymer system an aqueous emulsion of a waxy material which breaks to form a barrier to air at the coating surface.

6 Claims, No Drawings

ELECTRON BEAM CURING OF UNSATURATED COATING MATERIALS

The invention concerns a process for the preparation of organic coatings from hardenable polymer systems in which the polymer systems applied to a substrate are hardened by electron bombardment.

For some years the electron beam hardening of organic coatings from hardenable polymer systems has found increasing interest. In this process liquid surface coatings are converted by bombardment with energy-rich electrons into adherent, hard viscoelastic films. In contrast to the well known hardening of polymer systems by UV light, with electron beams pigmented paints can also be hardened. The process does not harm the environment as no emissions are given off to the atmosphere. It is considerably more rapid hardening than with UV light as the hardening time is only a fraction of a second. The radiation equipment is so far developed today that equipment and radiation-safe 150 to 250 kV generators are available, the depth of penetration of which, makes possible the hardening of paint films up to 300 $\mu$m thick. A disadvantage of electron beam curing however, is that the hardening of polymer coatings cannot be carried out in the air. The atmospheric oxygen is harmful to the polymerisation and crosslinking reactions so that the coated surface remains tacky. In order to avoid this disadvantage the electron beam radiation is carried out under protective gas such as nitrogen or carbon dioxide. Depending on the size of the object to be coated, a more or less large and correspondingly costly chamber is required, the space requirement of which makes technical application difficult and the cost of which is detrimental to the economy of the process.

For this reason attempts have been made to solve the problem by modification of the polymer system and materials are added to the polymer system which should protect the film surface from access of the atmospheric oxygen. Solutions of paraffin wax and other waxy materials in aromatic hydrocarbons or styrene were used for the formation of a protective layer. These barrier materials have proved to be effective on UV curing since the paraffinic and other waxy materials are concentrated at the surface and prevent access of atmospheric oxygen. In electron beam curing these materials could not be satisfactory because the formation of the barrier layer at the film surface did not take place fast enough.

In order to be able to use fully the particular advantage of electron beam curing, the extremely short time of hardening, the development of a process was therefore required with which a formation of the surface barrier layer could be achieved in an extremely short time.

According to this invention we provide a process for the preparation of organic coatings from curable polymer systems in which the polymer systems applied to a substrate are hardened by electron bombardment, characterised in that to the polymer systems is added a barrier material (to protect the surface from the access of air) in the form of an aqueous emulsion of a waxy material.

With the known solutions of paraffin or other waxy materials it can be observed that they are often not compatible with the polymers, oligomers or monomers in the polymer systems, that they dissolve poorly in the polymer system and that after a certain period crystallise out again. They do not form a coherent barrier layer and exist as particles in the paint film; thereby being unable to prevent access of the atmospheric oxygen to the paint film.

The invention now consists in using exactly this incompatibility of the waxy materials with monomeric and oligomeric components of the polymer system in order to achieve a rapid breaking of the emulsion and floating of the waxy material. On introduction of the emulsion into a polymer system the waxy material first becomes very finely divided in the polymer system. After the application of a thin layer of the polymer system to a substrate the emulsion breaks, the waxy material rises and forms a coherent barrier layer on the surface of the polymer film.

The emulsion consists of a waxy material emulsified in water. As waxy materials can be used: paraffins with melting points between 30° and 100° C.; higher fatty acids such as stearic and palmitic acid and their mixtures; $C_{10}$ to $C_{20}$ fatty alcohols such as stearyl alcohol and palmityl alcohol (cetyl alcohol) and their mixtures; esters of higher fatty acids with fatty alcohols and their mixtures; vegetable, animal, mineral and synthetic waxes, such as carnauba wax, palm wax, sperm oil, beeswax, montan wax, ester waxes, ketone waxes, ether waxes, waxy derivatives of succinic acid, phenoxy waxes, terphenylene waxes and others.

The emulsion may be of the water-in-oil type and also of the oil-in-water type. It contains 10 to 50 parts by weight of the waxy material and 90 to 50 parts by weight of water and also an emulsifier.

The emulsifier is selected according to the type of emulsion. In each case suitable emulsifiers are known and need not therefore be described in detail here. For an emulsion which contains 50 wt.% of the waxy material, emulsifiers from highly oxyethylated fatty alcohols are suitable. The content of the emulsifier in the emulsion amounts to 0.5–5 wt.%.

The emulsion can be prepared by mixing the components and homogenising the mixture in an homogeniser. Useful paraffin emulsions are however also commercially available.

In the presence of a good homogenising device and with careful operation the emulsion of the waxy material can be mixed-in directly in a polymer system. For 100 parts by weight of the polymer system, 1 to 10 parts emulsion are used.

In many cases the product prepared from the polymer system and the emulsion is not stable for long enough: the emulsion breaks too soon and the waxy materials float to the surface prematurely. In this case an emulsion is used which can be prepared by dilution of the above-described original emulsion with a liquid monomer or oligomeric vinyl compound and homogenisation of the diluted emulsion. Suitable vinyl compounds are: 1,6-hexanediol diacrylate, 1,4-butanediol diacrylate, diethylene glycol diacrylate, tetraethyleneglycol diacrylate, tripropyleneglycol diacrylate, pentaerythritol triacrylate, neopentylglycol diacrylate, oligotriacrylate, modified trimethylolpropane monoacrylate, tetraoxyethylated trimethylolpropane, triacrylate, hydroxyisopropyl methacrylate, trimethylolpropane trimethacrylate, styrene and others. About 1 to 10 parts by weight of the original emulsion described above are thinned with 90 to 100 parts by weight of the monomeric or oligomeric vinyl compound, emulsified and homogenised. 10 to 50 wt. % of this thinned emulsion are added to the polymer system and emulsified in.

The process is applicable to numerous polymer systems. Examples of main components of such polymer systems include: acrylic esters, methacrylic esters, maleic and fumaric esters, esters of vinyl alcohol, vinyl ethers, aromatic vinyl compounds, allyl compounds, urethane-acrylates and also complicated products such as adducts of unsaturated compounds with epoxy resins and polyisocyanates. In principle the invention is applicable to any polymer system which contains unsaturated compounds and which must be protected from access of air during electron beam curing.

The properties of the hardened coating are not impaired by the addition of emulsion forming a barrier layer. The coating shows, after hardening, the same properties as a coating hardened under inert gas, for example, hardness, weather resistance, corrosion protective effect on testing in the salt-spray test, and adhesive strength.

The invention will be explained more closely on the basis of the following examples. It is however, not restricted to these examples.

Unless otherwise stated, all parts are parts by weight and all percentages, percentages by weight.

EXAMPLE 1

For the preparation of one of the emulsions forming a barrier layer the following components were used:
- 0.5 to 5 parts highly oxyethylated fatty alcohol as emulsifier.
- 50 to 100 parts water
- 50 to 100 parts hard paraffin (M.P. 42°–70° C.)

The oxyethylated fatty alcohol is dissolved in water at 25° C. The paraffin is melted and the melt poured in a thin jet into the aqueous solution of the oxyethylated fatty alcohol. Then the mixture is emulsified in a homogeniser.

EXAMPLE 2

For the preparation of a thinned emulsion, 1 to 10 parts of the emulsion of Example 1 were mixed with 90 to 100 parts of a liquid monomeric or oligomeric vinyl compound from the group given above, e.g. 1,6-hexanediol diacrylate or hydroxyisopropyl methacrylate, and emulsified in a homogeniser.

EXAMPLE 3

To 100 parts of a polymer system comprising:
- 10 to 100 parts urethane-acrylate.
- 1 to 50 parts aluminum bronze and
- 10 to 100 parts of a further monomer selected from those mentioned above as useful in polymer systems, is added 10 to 100 parts of the thinned emulsion of Example 2. The mixture is emulsified in a homogeniser and the emulsified product applied by spraying, rolling or pouring onto a substrate. The paint film on the coated object is then hardened by electron bombardment in 150 to 400 kV electron beam equipment at an energy does of $10^3$ to $80.10^3$ J/kg (1 to 80 Mrd). A paint film is obtained with the same properties as those of a paint film hardened under inert gas for example a Vickers hardness of about 18 and similar weathering resistance and corrosion protective effect on the salt-spray test.

For polymer systems based on polyesters a higher proportion of protective layer emulsion in the paint than with other polymer systems is generally required.

EXAMPLE 4

With the aid of a good homogenising device the emulsion of Example 1 can also be emulsified directly into a polymer system. In this case one uses for example:
- 100 parts of the polymer system from Example 3
- 1 to 10 parts of the emulsion used in Example 1.

The paint film obtained with this product has the same properties as paint films prepared according to the process of Example 3.

COMPARATIVE EXAMPLE

A solution of 1 to 10 parts hard paraffin in 99 to 90 parts of one of the above liquid monomeric vinyl compounds was added in an amount of 1 to 10% to the polymer system of Example 3. Already after a short time separation of the paraffin in a crystalline form took place so that the system was not suited for the preparation of a paint film hardenable by electron bombardment.

What I claim is:

1. A process for the preparation of organic coatings from curable polymer systems in which the polymer systems applied to a substrate are hardened by electron bombardment, characterised in that, prior to application, a barrier material (to protect the surface from the access of air) in the form of an aqueous emulsion of a waxy material is admixed with the curable polymer systems.

2. A process according to claim 1, characterised in that an emulsion is used which consists of 10 to 50 parts by weight of the waxy material, 90 to 50 parts by weight of water and 0.5 to 5 parts of an emulsifier.

3. A process according to claim 1 or claim 2, characterised in that as the waxy material is used a paraffin, a higher fatty acid, a fatty alcohol, an ester of a higher fatty acid, or a mixture thereof, or a vegetable, animal or synthetic wax.

4. A process according to claim 1, characterised in that the emulsion is added to 100 parts of the polymer system in an amount of 1 to 10 parts by weight.

5. A process according to claim 1, characterised in that the emulsion, prior to addition to the polymer system, is thinned with a liquid monomeric or oligomeric vinyl compound and emulsified.

6. A process according to claim 5, characterised in that the emulsion, thinned with a liquid monomeric or oligomeric vinyl compound is added to the polymer system in an amount from 10 to 50 weight percent.

* * * * *